US011794357B2

(12) United States Patent
Fukuoka

(10) Patent No.: US 11,794,357 B2
(45) Date of Patent: Oct. 24, 2023

(54) PROCESSING APPARATUS

(71) Applicant: DISCO CORPORATION, Tokyo (JP)

(72) Inventor: Takeomi Fukuoka, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 532 days.

(21) Appl. No.: 17/094,160

(22) Filed: Nov. 10, 2020

(65) Prior Publication Data

US 2021/0162608 A1 Jun. 3, 2021

(30) Foreign Application Priority Data

Nov. 28, 2019 (JP) .................................. 2019-215408

(51) Int. Cl.
*B25J 15/06* (2006.01)
*B25B 11/00* (2006.01)
*B23D 49/00* (2006.01)

(52) U.S. Cl.
CPC .......... *B25J 15/065* (2013.01); *B23D 49/007* (2013.01); *B25B 11/005* (2013.01); *B25J 15/0683* (2013.01)

(58) Field of Classification Search
CPC .... B25J 15/065; B25J 15/0683; B25J 15/085; B25J 15/0616; B23D 49/007; B25B 11/005; B28D 5/0082; B28D 5/0094; B25D 5/0076; H01L 21/6838; H01L 21/67092; H01L 21/6836; H01L 2221/68327; H01L 21/78; H01L 21/304
USPC .......................................... 83/152, 100, 177
See application file for complete search history.

(56) References Cited

U.S. PATENT DOCUMENTS

| | | | |
|---|---|---|---|
| 2003/0211812 A1* | 11/2003 | Isobe ................ H01L 21/68728 451/5 |
| 2012/0137847 A1* | 6/2012 | Qiu ...................... B28D 5/0076 83/177 |
| 2017/0062263 A1* | 3/2017 | Kesil .................. H01L 21/67259 |
| 2017/0236267 A1* | 8/2017 | Negishi ............. H01L 21/67288 348/87 |
| 2019/0273010 A1* | 9/2019 | Yamamoto ............ B25B 11/005 |
| 2020/0219751 A1* | 7/2020 | Miyagi ............. H01L 21/67092 |
| 2020/0335370 A1* | 10/2020 | Ohkubo ............. H01L 21/67092 |
| 2021/0028063 A1* | 1/2021 | Zhao ........................ H01L 21/78 |

FOREIGN PATENT DOCUMENTS

JP 2001024050 A 1/2001

* cited by examiner

*Primary Examiner* — Ghassem Alie
(74) *Attorney, Agent, or Firm* — Greer, Burns & Crain, Ltd.

(57) ABSTRACT

A processing apparatus includes a table base to which a jig table is removably secured, a cutting unit, a moving assembly for moving the table base between a processing area and a mounting/dismounting area, and a delivery assembly for delivering the jig table from a temporary rest area onto the table base while applying a negative pressure to a second suction channel of the jig table. The delivery assembly includes a pair of grippers for gripping both sides of the jig table, a suction pipe connected to the second suction channel of the jig table that is gripped by the grippers, and a lifting and lowering unit for positioning the suction pipe selectively in an operative position where the suction pipe is connected to the second suction channel and a lifted position where the suction pipe is spaced from the second suction channel.

4 Claims, 5 Drawing Sheets

PROCESSING APPARATUS

BACKGROUND OF THE INVENTION

Field of the Invention

The present invention relates to a processing apparatus.

Description of the Related Art

There are known processing apparatuses, exemplified by a cutting apparatus, for holding a workpiece on a chuck table and processing, i.e., cutting, the workpiece held on the chuck table with a processing unit. Usually, workpieces are fixed to respective annular frames by respective adhesive tapes, and placed on and removed from the chuck table, one by one, each time it is processed by the processing unit. However, the cost of processing workpieces is high as the adhesive tapes are thrown away after being used. One solution is to use a jig dicer in which a workpiece is directly fixed to a chuck table and processed.

The jig dicer loads a workpiece onto and unloads a workpiece from the chuck table. In a case where workpieces are of a small size or a special shape, they are difficult to deliver to and from the chuck table. In view of the difficulty, there has been devised a method of delivering a jig table with a workpiece preset thereon as a chuck table to a table base. While the workpiece is being delivered by a delivery mechanism, there is concern over possible dislodgment of the workpiece from the jig table. To prevent the workpiece from being dislodged from the jig table, the jig table is combined with a suction mechanism for keeping a negative pressure in the jig table for attracting the workpiece under suction to a holding surface of the jig table (see, for example, JP2001-24050A).

SUMMARY OF THE INVENTION

However, according to the method disclosed in JP2001-24050A, air tends to enter through a gap between the workpiece and the holding surface of the jig table, lowering suction forces applied to the workpiece under the negative pressure and possibly dislodging the workpiece in delivery. Consequently, there has been a demand for a mechanism for applying the negative pressure to the workpiece during delivery. Furthermore, the delivery mechanism includes a clamp mechanism for fixing the jig table in position. The processing apparatus requires actuators for positioning the suction mechanism and the clamp mechanism in respective operational positions and respective retracted positions. As a result, the processing apparatus is relatively complex in structure and large in size and weight.

It is therefore an object of the present invention to provide a processing apparatus that is capable of preventing a workpiece from being dislodged in delivery and that is restrained from being complex in structure.

In accordance with an aspect of the present invention, there is provided a processing apparatus for processing a workpiece, including a jig table including a holding area for holding a workpiece thereon, a first suction channel having an end connected to the holding area and another end open at a lower surface of the jig table, and a second suction channel having an end connected to the holding area and another end open at an upper surface of the jig table, a table base to which the jig table is removably secured, for applying a negative pressure from the first suction channel to the holding area, a processing unit for processing the workpiece held on the jig table secured to the table base, a moving assembly for moving the table base between a processing area where the workpiece is processed by the processing unit and a mounting/dismounting area where the jig table is mounted on and dismounted from the table base, a temporary rest area for temporarily placing thereon the jig table on which the workpiece is supported before the workpiece is processed, and a delivery assembly for delivering the jig table from the temporary rest area onto the table base while applying a negative pressure to the second suction channel of the jig table, in which the delivery assembly includes a pair of grippers for gripping both sides of the jig table from above, a suction pipe connected from above to an opening of the second suction channel of the jig table that is gripped by the grippers, for applying a suction force under the negative pressure in the second suction channel to the holding area to hold the workpiece under suction thereon, and a lifting and lowering unit for lifting and lowering the suction pipe to position the suction pipe selectively in an operative position where the suction pipe is connected to the opening of the second suction channel and a lifted position where the suction pipe is spaced from the opening of the second suction channel, and in which the grippers are operatively connected to the lifting and lowering unit by a link mechanism and are openable and closable in response to lifting and lowering movement of the lifting and lowering unit for thereby selectively releasing and gripping the jig table.

The processing apparatus may further include a check valve disposed in each of the other ends of the first suction channel and the second suction channel.

The processing apparatus according to the present invention is advantageous in that it prevents the workpiece from being dislodged while it is being delivered and the processing apparatus itself is restrained from being complex in structure.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

A preferred embodiment of the present invention will hereinafter be described in detail below with reference to the drawings. The present invention is not limited to the details of the embodiment described below. The components described below cover those which could easily be envisaged by those skilled in the art and those which are essentially identical to those described above. Furthermore, the arrangements described below can be used in appropriate combinations. Various omissions, replacements, or changes of the arrangements may be made without departing from the scope of the present invention.

Figure 1:
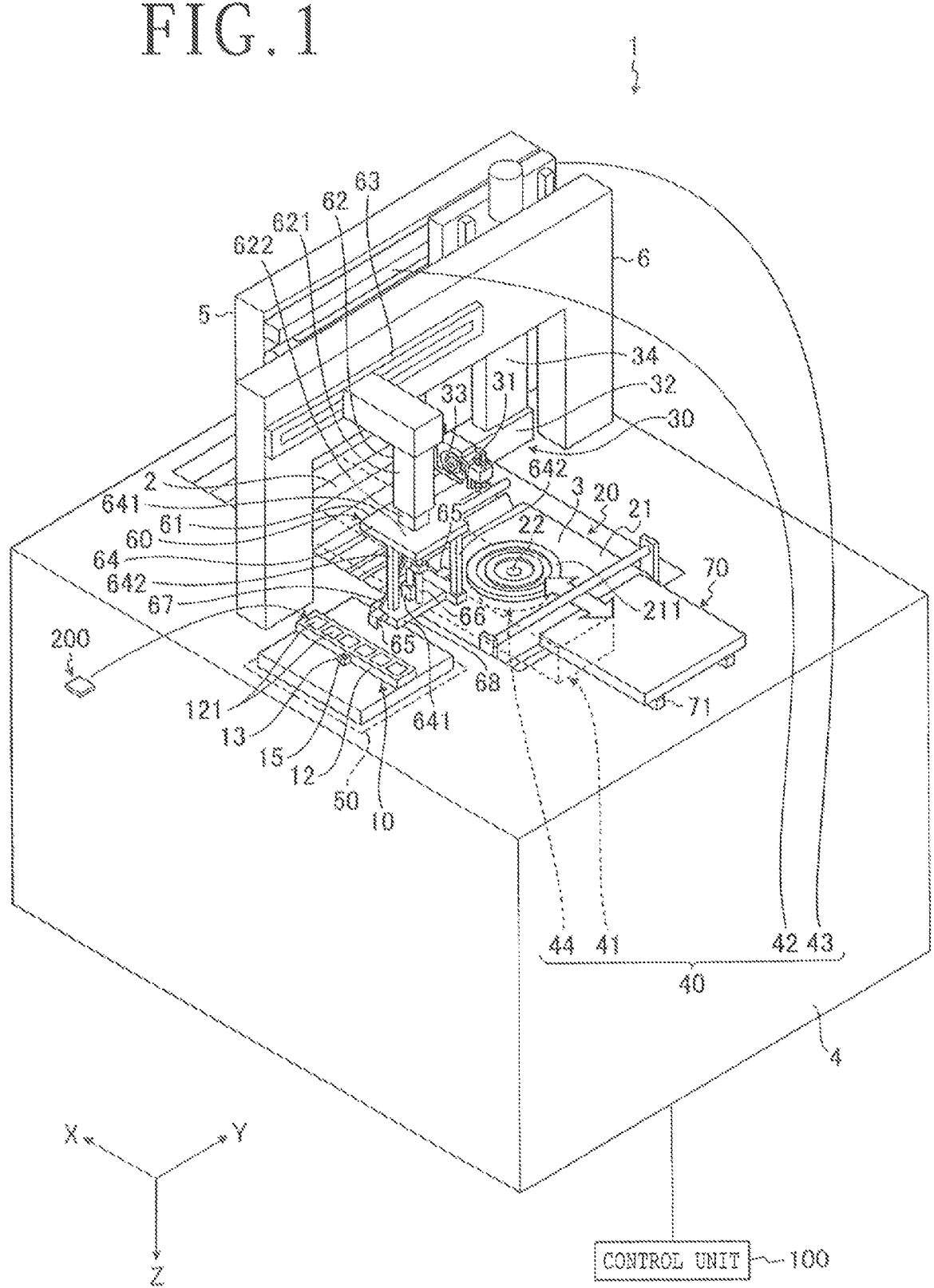
FIG. 1 is a perspective view of a processing apparatus according to an embodiment of the present invention.
Figure 2:
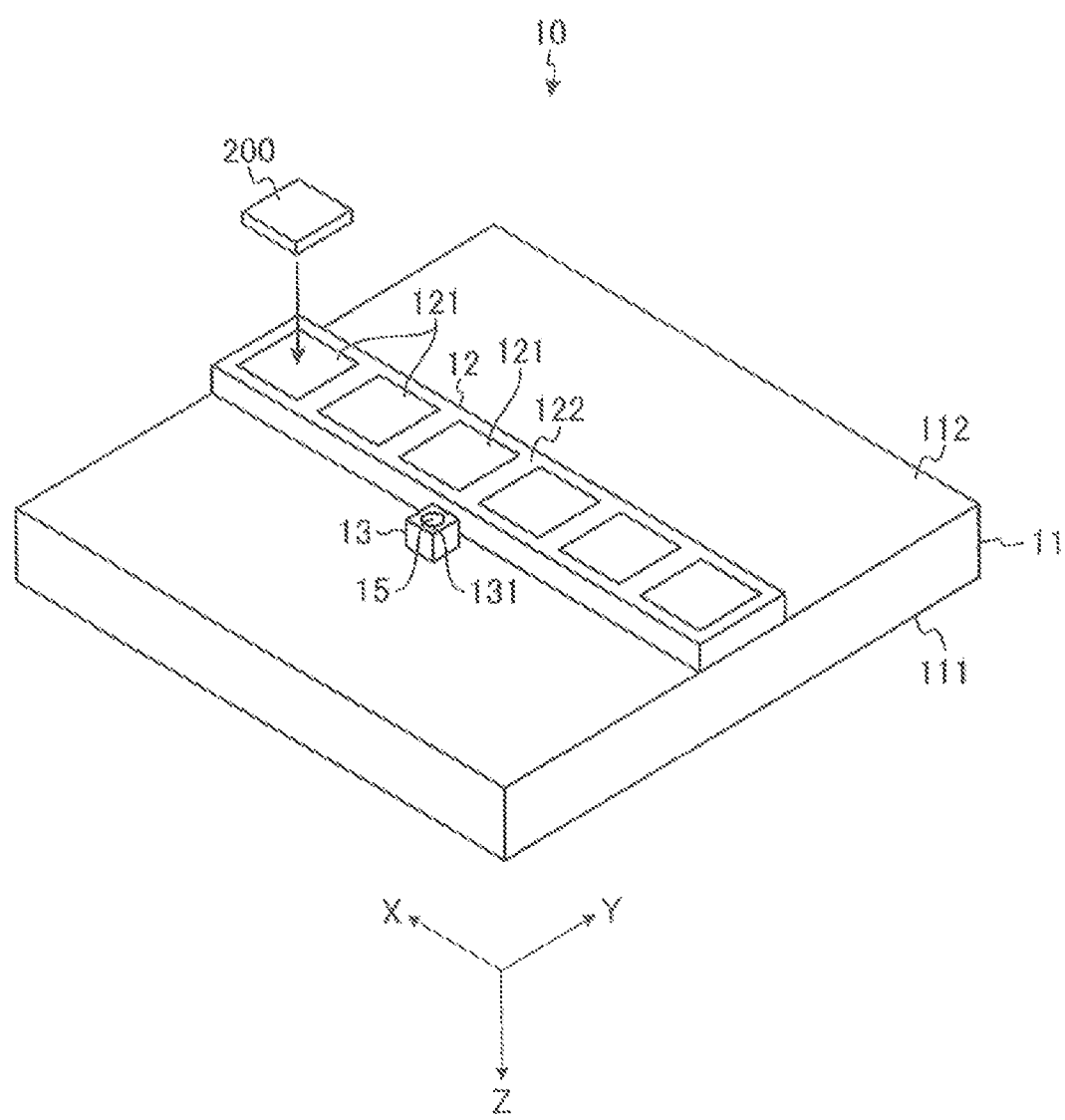
FIG. 2 is a perspective view schematically illustrating a jig table of the processing apparatus.
Figure 3:
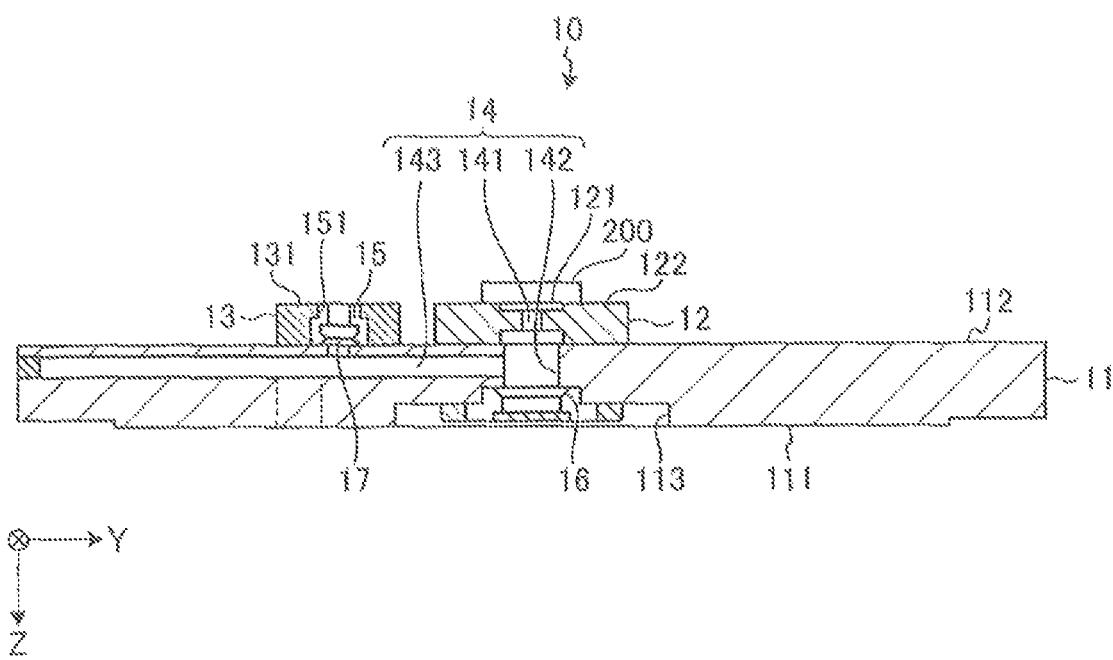
FIG. 3 is a cross-sectional view of the jig table illustrated in FIG. 1.
Figure 4:
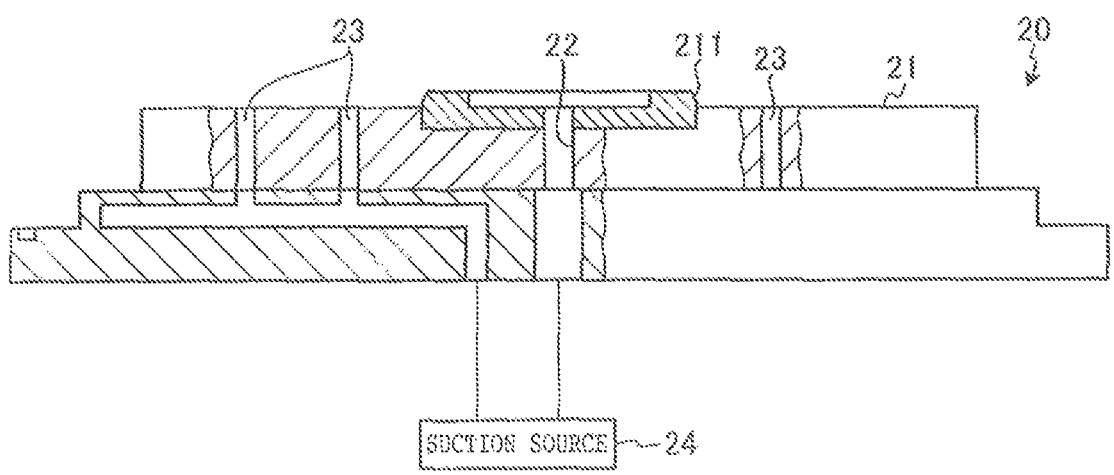
FIG. 4 is a side elevational view, partly in cross section, of a table base of the processing apparatus illustrated in FIG. 1.
Figure 5:
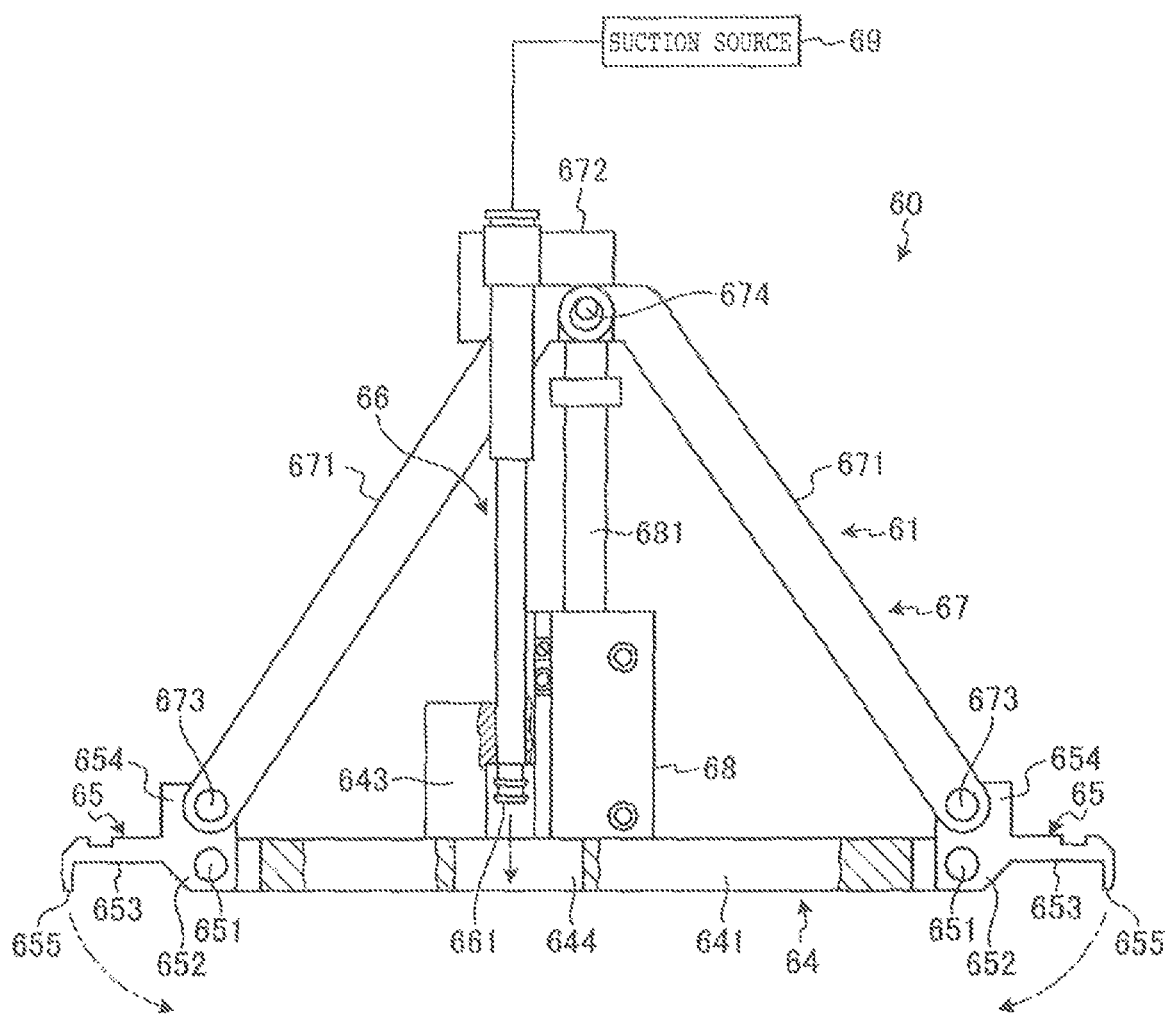
FIG. 5 is a side elevational view, partly in cross section, of a delivery assembly of the processing apparatus illustrated in FIG. 1.
Figure 6:
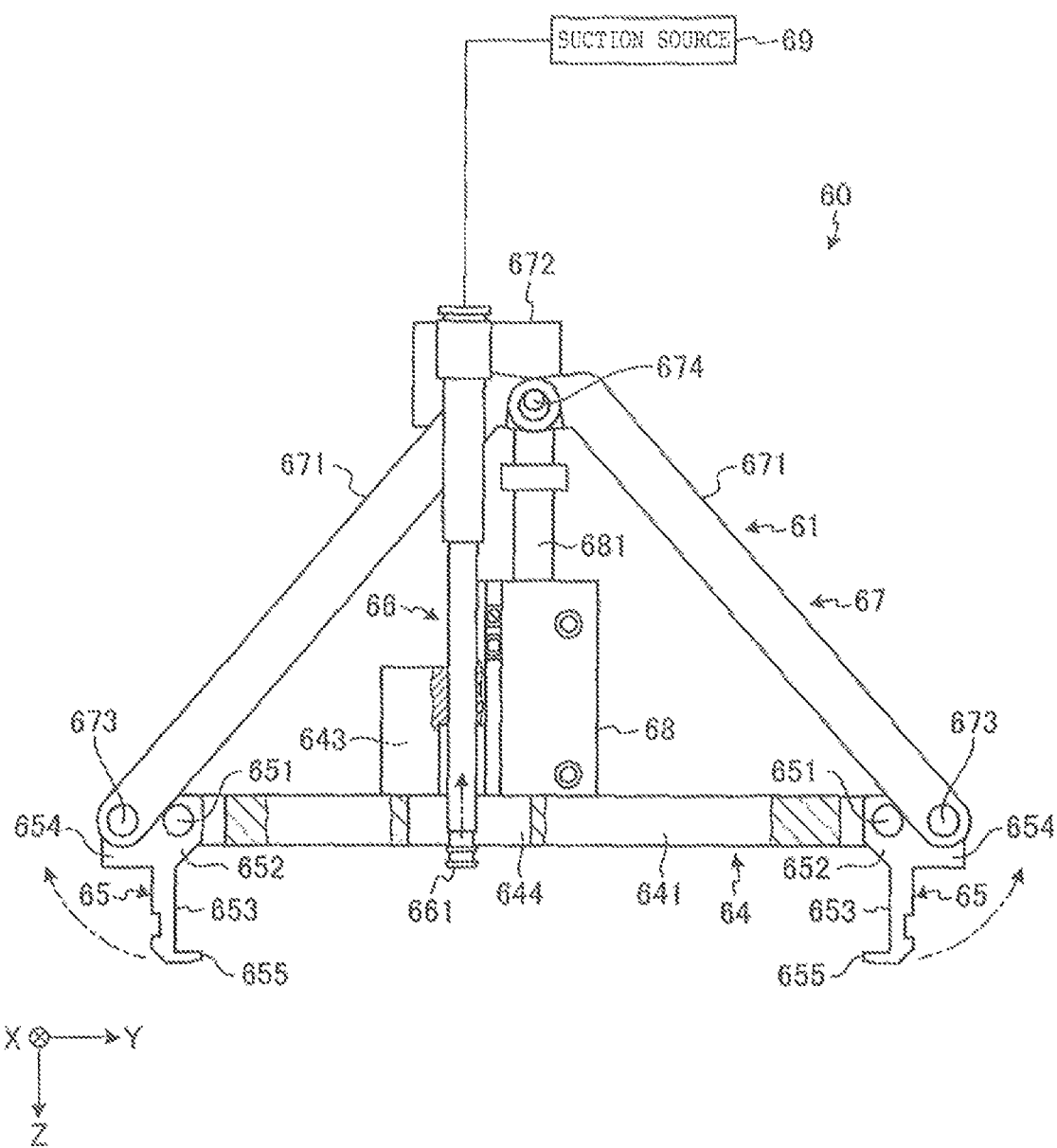
FIG. 6 is a side elevational view, partly in cross section, illustrating the manner in which the delivery assembly illustrated in FIG. 5 grips the jig table.

A processing apparatus according to the preferred embodiment of the present invention will be described in detail below. FIG. 1 illustrates in perspective the processing apparatus according to the preferred embodiment. FIG. 2 schematically illustrates in perspective a jig table of the processing apparatus illustrated in FIG. 1. FIG. 3 illustrates the jig table in cross section. FIG. 4 illustrates in side elevation, partly in cross section, a table base of the processing apparatus illustrated in FIG. 1. FIG. 5 illustrates, in side elevation, partly in cross section, of a delivery assembly of the processing apparatus illustrated in FIG. 1. FIG. 6 illustrates, in side elevation, partly in cross section, the manner in which the delivery assembly illustrated in FIG. 5 grips the jig table.

As illustrated in FIG. 1, the processing apparatus, denoted by 1 in FIG. 1, is a cutting apparatus for cutting, i.e., processing, a workpiece 200. According to the embodiment, the workpiece 200 is in the form of a flat plate that is rectangular in shape as viewed in plan, and includes a ceramic substrate, a ferrite substrate, a substrate including at least one of nickel, resin, and iron, or a glass substrate.

The processing apparatus 1 cuts or processes the workpiece 200 with a cutting blade 31 while the workpiece 200 is being held on a jig table 10. As illustrated in FIG. 1, the processing apparatus 1 includes the jig table 10 that holds the workpiece 200 under suction on a holding area 121 thereof, a table base 20 to which the jig table 10 is removably fixed, a cutting unit 30 as a processing unit that cuts the workpiece 200 held on the jig table 10 with the cutting blade 31, an image capturing unit, not illustrated, that captures an image of the workpiece 200 held on the jig table 10, and a control unit 100.

Furthermore, as illustrated in FIG. 1, the processing apparatus 1 includes a moving assembly 40 for moving the table base 20 and the cutting unit 30 relatively to each other. The moving assembly 40 includes an X-axis moving unit 41 as a processing feed unit that processing-feeds the table base 20 in X-axis directions parallel to horizontal directions, a Y-axis moving unit 42 as an indexing feed unit that indexing-feeds the cutting unit 30 in Y-axis directions parallel to horizontal directions and perpendicular to the X-axis directions, a Z-axis moving unit 43 as an incising feed unit that incising-feeds the cutting unit 30 in Z-axis directions parallel to vertical directions and perpendicular to both the X-axis directions and the Y-axis directions, and a rotating unit 44 that rotates the table base 20 about a central axis parallel to the Z-axis directions and perpendicular to both the X-axis directions and the Y-axis directions.

The X-axis moving unit 41 moves the table base 20 in the X-axis directions as processing feed directions between a processing area 2 where the workpiece 200 is processed and a mounting/dismounting area 3 where the jig table 10 is mounted on and dismounted from the table base 20, thereby processing-feeding the table base 20 and the cutting unit 30 relatively to each other in the X-axis directions. The Y-axis moving unit 42 moves the cutting unit 30 in the Y-axis directions as indexing feed directions, thereby indexing-feeding the table base 20 and the cutting unit 30 relatively to each other in the Y-axis directions. The Z-axis moving unit 43 moves the cutting unit 30 in the Z-axis directions as incising feed directions, thereby incising-feeding the table base 20 and the cutting unit 30 relatively to each other in the Z-axis directions. The rotating unit 44 supports the table base 20 thereon and is moved in unison with the table base 20 in the X-axis directions by the X-axis moving unit 41.

Each of the X-axis moving unit 41, the Y-axis moving unit 42, and the Z-axis moving unit 43 includes a known ball screw rotatable about a central axis thereof, a known motor for rotating the ball screw about its central axis, and a pair of known guide rails supporting the table base 20 or the cutting unit 30 thereon for movement in the X-axis directions, the Y-axis directions, or the Z-axis directions.

The jig table 10 as it is fixedly mounted on the table base 20 is movable in the X-axis directions by the X-axis moving unit 41 between the processing area 2 below the cutting unit 30 and the mounting/dismounting area 3 horizontally spaced from the processing area 2, and is also rotatable about the central axis parallel to the Z-axis directions by the rotating unit 44. As illustrated in FIGS. 1, 2, and 3, the jig table 10 includes a base 11, a holder 12, and a block 13. The base 11 is in the form of a thick flat plate that is of a rectangular planar shape, and is fixedly mounted on the table base 20.

The holder 12 is disposed on an upper surface 112 of the base 11. According to the present embodiment, the holder 12 is in the form of an elongate flat plate having a longitudinal axis parallel to the Z-axis directions and includes a plurality of holding areas 121 for holding respective workpieces 200 thereon. The holding areas 121 are disposed at spaced intervals along the X-axis directions. The holding areas 121 are defined as respective suction holes in an upper surface 122 of the holder 12 for holding respective workpieces 200 under suction on the holding areas 121. The block 13 is disposed on the upper surface 112 of the base 11 next in the Y-axis directions to a central portion in the X-axis directions of the holder 12. The block 13 has an upper surface 131 that lies flush with the upper surface 122 of the holder 12.

As illustrated in FIG. 3, the jig table 10 includes a first suction channel 14 and a second suction channel 15. The first suction channel 14 is defined as a space in the holder 12 and the base 11. The first suction channel 14 includes a plurality of holding area joint portions 141 having respective ends open into the centers of the holding areas 121 and hence joined to the holding areas 121, extending through the holder 12 in the Z-axis directions, and having other ends open at a lower surface of the holder 12, an in-the-base through portion 142 having an end joined to all of the holding area joint portions 141 and another end open at a lower surface 111 of the base 11, and a second suction channel joint portion 143 having an end joined to the in-the-base through portion 142 and another end open at a position where the upper surface 112 of the base 11 lies beneath a lower surface of the block 13. According to the present embodiment, the in-the-base through portion 142 and the holding area joint portions 141 are connected to the second suction channel 15 through the second suction channel joint portion 143, as described later.

The second suction channel 15 is defined as a space in the block 13. The second suction channel 15 extends in the Z-axis directions through a central region of the block 13 and has an end connected to the second suction channel joint portion 143 of the first suction channel 14 and connected to the holding areas 121 through the first suction channel 14. The second suction channel 15 has another end open in a central region of the upper surface 131 of the block 13. The hole of the other end of the second suction channel 15 that is open in the upper surface 131 will hereinafter be referred to as an opening 151.

The jig table 10 includes a first check valve 16 disposed in the other end of the in-the-base through portion 142 of the first suction channel 14, and a second check valve 17 disposed in the other end of the second suction channel 15. Therefore, the first check valve 16 and the second check valve 17 are disposed respectively in the other ends of the first suction channel 14 and the second suction channel 15. When a gas flows from the holding areas 121 toward the lower surface 111 of the base 11, i.e., from the holding area joint portions 141 into the in-the-base through portion 142 of the first suction channel 14, the first check valve 16 is opened, allowing the gas to flow from the holding areas 121 therethrough to the lower surface 111 of the base 11, i.e., from the holding area joint portions 141 of the first suction channel 14 into the in-the-base through portion 142 and through the first check valve 16. Conversely, when a gas flows from the lower surface 111 of the base 11, i.e., the in-the-base through portion 142 of the first suction channel 14 toward the holding areas 121 through the holding area joint portions 141, and when a gas does not flow in the first suction channel 14, the first check valve 16 is closed to prevent a gas from flowing therethrough.

When a gas flows from the other end of the second suction channel 15 toward the upper surface 131 of the block 13, the second check valve 17 is opened to allow a gas to flow from the holding areas 121 through the holding area joint portions 141 into the in-the-base through portion 142 of the first suction channel 14. Conversely, when a gas flows from the upper surface 131 of the block 13 toward the other end of the second suction channel 15, and when a gas does not flow in the second suction channel 15, the second check valve 17 is closed.

The base 11 of the jig table 10 has a fitting recess 113 defined in the lower surface 111 of the base 11 around the other end of the in-the-base through portion 142 of the first suction channel 14. The fitting recess 113 is defined by a recess surface extending into the base 11 from the lower surface 111 thereof.

As illustrated in FIG. 1, the table base 20 that is supported on the rotating unit 44 is movable in the X-axis directions between the processing area 2 and the mounting/dismounting area 3 where the jig table 10 is mounted and dismounted, by the X-axis moving unit 41, and is also rotatable about the central axis parallel to the Z-axis directions by the rotating unit 44. The table base 20 is in the form of a thick flat plate that is of a rectangular planar shape, and the jig table 10 is placed on an upper surface 21 of the table base 20.

As illustrated in FIG. 4, the table base 20 includes a fitting land 211 disposed centrally in the upper surface 21 for entering the fitting recess 113 in the base 11 of the jig table 10 for fitting engagement therein, a third suction channel 22 defined centrally in the fitting land 211 and the table base 20 and extending therethrough in the Z-axis directions, and a plurality of fourth suction channels 23 defined in the fitting land 211 and the table base 20 and having upper ends open at the upper surface 21 of the table base 20 around the fitting land 211. The fitting land 211 has a protrusion surface protruding from the upper surface 21 of the table base 20.

The third suction channel 22 and the fourth suction channels 23 are defined as spaces in the table base 20. When the jig table 10 is placed on the upper surface 21 of the table base 20 and the fitting land 211 is fitted in the fitting recess 113, the third suction channel 22 and the in-the-base through portion 142 of the first suction channel 14 are connected to each other through respective on-off valves, not illustrated. The third suction channel 22 and the fourth suction channels 23 are connected to a suction source 24 that may be an ejector or the like.

When the jig table 10 is placed on the upper surface 21 of the table base 20, the fitting land 211 is fitted in the fitting recess 113, the third suction channel 22 is connected to the in-the-base through portion 142 of the first suction channel 14, and the upper ends of the fourth suction channels 23 that are open at the upper surface 21 face the lower surface 111 of the base 11 of the jig table 10. When the suction source 24 is actuated, it evacuates the fourth suction channels 23, attracting the jig table 10 to the upper surface 21 under a negative pressure, so that the jig table 10 is securely held on the upper surface 21. The suction source 24 also evacuates the third suction channel 22, opening the first check valve 16 and closing the second check valve 17 thereby to apply a negative pressure from the first suction channel 14 to the holding areas 121 of the jig table 10, so that workpieces 200 are securely held under suction on the respective holding areas 121. Therefore, the jig table 10 according to the present embodiment holds the workpieces 200 under suction directly on the holding areas 121 without the need for holding members such as adhesive tapes on the workpieces 200.

The cutting unit 30 is a processing unit on which the cutting blade 31 for cutting workpieces 200 held on the jig table 10 secured to the table base 20 are removably mounted. As illustrated in FIG. 1, the cutting unit 30 is movable in the Y-axis directions by the Y-axis moving unit 42 and in the Z-axis directions by the Z-axis moving unit 43 with respect to the workpieces 200 held on the jig table 10.

As illustrated in FIG. 1, the cutting unit 30 is mounted on a support frame 5 erected on an apparatus body 4 by the Y-axis moving unit 42 and the Z-axis moving unit 43. The cutting unit 30 is moved by the Y-axis moving unit 42 and the Z-axis moving unit 43 to position the cutting blade 31 at any desired position on the holding areas 121 of the jig table 10 secured to the table base 20.

The cutting unit 30 includes the cutting blade 31, a spindle housing 32 movable in the Y-axis directions by the Y-axis moving unit 42 and in the Z-axis directions by the Z-axis moving unit 43, and a spindle 33 rotatably mounted in the spindle housing 32 for rotation about its central axis and rotatable by an electric motor, not illustrated. The cutting blade 31 is mounted on the tip end of the spindle 33. The spindle housing 32 is supported on a moving member 34 of the Z-axis moving unit 43.

The cutting blade 31 is in the form of an ultrathin cutting grindstone that is substantially ring-shaped. According to the present embodiment, the cutting blade 31 is what is called a hub blade including a circular base and an annular cutting edge disposed on an outer circumferential edge of the circular base for cutting workpieces 200. The cutting edge is made of abrasive grains of diamond, cubic boron nitride (CBN), or the like that are bound by a bonding material or binder of metal, resin, or the like, and has a predetermined thickness. According to the present invention, the cutting blade 31 may be what is called a washer blade having only a cutting edge 212. The cutting blade 31 is rotated about its central axis when the spindle 33 is rotated about its central axis by the electric motor. The central axes of the cutting blade 31 and the spindle 33 of the cutting unit 30 extend parallel to the Y-axis directions.

The image capturing unit includes an image capturing device for capturing an image of an area to be divided of a workpiece 200 held on the jig table 10 secured to the table base 20 before the workpiece 200 is cut by the cutting unit 30. The image capturing device may be a charge-coupled device (CCD) image capturing device or a complementary metal oxide semiconductor (CMOS) image capturing device, for example. The image capturing unit captures an image of the workpiece 200 held on the jig table 10 secured to the table base 20, to be used for an alignment process for positioning the workpiece 200 and the cutting blade 31 with respect to each other, and outputs the captured image to the control unit 100.

The processing apparatus 1 further includes an X-axis position detecting unit, not illustrated, for detecting a position of the jig table 10 in the X-axis directions, a Y-axis position detecting unit, not illustrated, for detecting a position of the cutting unit 30 in the Y-axis directions, and a Z-axis position detecting unit, not illustrated, for detecting a position of the cutting unit 30 in the Z-axis directions. Each of the X-axis position detecting unit and the Y-axis position detecting unit may include a linear scale parallel to the X-axis directions or the Y-axis directions and a reading head. The Z-axis position detecting unit detects a position of the cutting unit 30 in the Z-axis directions with pulses from the electric motor. The X-axis position detecting unit, the Y-axis position detecting unit, and the Z-axis position detecting unit output detected positions of the jig table 10 in the X-axis directions and the cutting unit 30 in the Y-axis directions and the Z-axis directions to the control unit 100. According to the present embodiment, positions of various operative components of the processing apparatus 1 in the X-axis directions, the Y-axis directions, and the Z-axis directions are defined with respect to predetermined reference positions, not illustrated.

The control unit 100 controls the operative components of the processing apparatus 1 to enable the processing apparatus 1 to perform a processing operation on a workpiece 200. The control unit 100 is a computer including an arithmetic processing device having a microprocessor such as a central processing unit (CPU), a storage device having a memory such as a read only memory (ROM) or a random access memory (RAM), and an input/output interface. The arithmetic processing device of the control unit 100 performs arithmetic operations according to computer programs stored in the storage device and generates and outputs control signals for controlling the processing apparatus 1 via the input/output interface to the operative components of the processing apparatus 1.

The control unit 100 is electrically connected to a display unit, not illustrated, such as a liquid crystal display device, for displaying states and images of processing operations and an input unit, not illustrated, to be used by the operator to register processing content information, etc. The input unit may be at least one of a touch panel incorporated in the display unit and an external input device such as a keyboard or the like.

As illustrated in FIG. 1, the processing apparatus 1 also includes a temporary rest area 50, a delivery assembly 60, and an unloading table 70.

The temporary rest area 50 is an area where the jig table 10 supporting workpieces 200 to be cut is temporarily placed. The temporary rest area 50 is disposed next in the Y-axis directions to the table base 20 that is positioned in the mounting/dismounting area 3 on an upper surface of the apparatus body 4. The jig table 10 with the workpieces 200 put on the respective holding areas 121 of the holder 12 is temporarily placed on the temporary rest area 50.

The unloading table 70 is used to place thereon the jig table 10 on which workpieces 200 that have been cut are supported. The unloading table 70 is disposed in a position juxtaposed in the X-axis directions with the table base 20 on the upper surface of the apparatus body 4. The unloading table 70 is movable by a moving mechanism 71 between the position illustrated in FIG. 1 that is juxtaposed in the X-axis directions with the table base 20 positioned in the mounting/dismounting area 3 and a position on the table base 20 positioned in the mounting/dismounting area 3.

The delivery assembly 60 delivers the jig table 10 placed on the temporary rest area 50 onto the table base 20 while applying a negative pressure to the second suction channel 15 in the jig table 10 and also delivers the jig table 10 from the table base 20 onto the unloading table 70. The delivery assembly 60 includes a gripping unit 61 for gripping both sides in the Y-axis directions of the jig table 10, a Z-axis moving unit 62 for supporting the gripping unit 61 and vertically moving the gripping unit 61 in the Z-axis directions, and a Y-axis moving unit 63 for moving the Z-axis moving unit 62 and the gripping unit 61 in the Y-axis directions.

The Z-axis moving unit 62 is constructed as an air cylinder having a longitudinal axis extending parallel to the Z-axis directions and including a cylinder 621 and a rod 622 movable into and out of the cylinder 621. The rod 622 that is telescopically disposed in the cylinder 621 has a lower distal end directed downwardly, and the gripping unit 61 is mounted on the lower distal end of the rod 622. The Z-axis moving unit 62 vertically moves, i.e., lifts and lowers, the gripping unit 61 when the rod 622 is moved into and out of the cylinder 621.

The Y-axis moving unit 63 is supported on a second support frame 6 erected on an apparatus body 4, and moves the cylinder 621 of the Z-axis moving unit 62 in the Y-axis directions. The Y-axis moving unit 63 moves the gripping unit 61 in the Y-axis directions by moving the cylinder 621 of the Z-axis moving unit 62 in the Y-axis directions.

As illustrated in FIGS. 5 and 6, the gripping unit 61 has a unit body 64, a pair of grippers 65, a suction pipe 66, a link mechanism 67, and a lifting and lowering unit 68. The unit body 64 is mounted on the lower distal end of the rod 622 of the Z-axis moving unit 62. According to the present embodiment, as illustrated in FIG. 1, the unit body 64 includes a pair of upper and lower horizontal plates 641 that are spaced apart from each other in the Z-axis directions and a joint rod 642 interconnecting the upper and lower horizontal plates 641.

The grippers 65 grip both sides in the Y-axis directions of the jig table 10 from above. The grippers 65 are rotatably supported on respective both ends in the Y-axis directions of the lower horizontal plate 641 for rotation about respective shafts 651 parallel to the X-axis directions. Each of the grippers 65 includes a rotational support 652 supported on the end of the lower horizontal plate 641 for rotation about the shaft 651, and a first extension 653 and a second extension 654 that extend from the rotational support 652 in respective directions that are perpendicular to each other. The first extension 653 includes a finger 655 that supports and grips an end in the Y-axis directions of the lower surface 111 of the jig table 10 when the first extension 653 lies parallel to the Z-axis directions. Each of the grippers 65 is rotatably supported on the horizontal plate 641 for rotation about the shaft 651 between an open position illustrated in FIG. 5 in which the first extension 653 lies parallel to the Y-axis directions and the second extension 654 is oriented upwardly from the rotational support 652 along the Z-axis directions and a gripping position illustrated in FIG. 6 in which the first extension 653 is oriented downwardly from the rotational support 652 along the Z-axis directions and the second extension 654 lies parallel to the Y-axis directions.

When the jig table 10 is gripped by the grippers 65, the suction pipe 66 is connected from above to the opening 151 of the second suction channel 15 in the jig table 10. The suction pipe 66 applies therethrough a suction force through the second suction channel 15 to the holding areas 121 of the jig table 10 gripped by the grippers 65 to hold workpieces 200 under suction on the holding areas 121. The suction pipe 66 is in the form of a straight pipe having a longitudinal axis parallel to the Z-axis directions, and is movably supported on a slide support member 643 mounted on the lower horizontal plate 641 for movement by the lifting and lowering unit 68 in the Z-axis directions. The suction pipe 66 has an upper end connected to a suction source 69 that may be an ejector or the like. When the suction pipe 66 is lifted along the Z-axis directions by the lifting and lowering unit 68 until a lower end 661 of the suction pipe 66 reaches a lifted position illustrated in FIG. 5 where the lower end 661 is retracted through a through hole 644 defined in the lower horizontal plate 641, the lower end 661 is spaced from the opening 151 of the second suction channel 15 in the jig table 10 gripped by the grippers 65.

Conversely, when the suction pipe 66 is lowered along the Z-axis directions by the lifting and lowering unit 68 until the lower end 661 reaches an operative position illustrated in FIG. 6 where the lower end 661 protrudes through the through hole 644 below the lower surface of the lower horizontal plate 641, the lower end 661 is connected to the opening 151 of the second suction channel 15 in the jig table 10. When the lower end 661 is connected to the opening 151 of the second suction channel 15 in the jig table 10, the suction pipe 66 is evacuated by the suction source 69. The second check valve 17 is opened, allowing the suction source 69 to evacuate the second suction channel 15 and the first suction channel 14, and the first check valve 16 is closed, applying the suction force to the holding areas 121 to hold the workpieces 200 under suction on the holding areas 121.

The link mechanism 67 interlinks the movement of the suction pipe 66 in the Z-axis directions and the movement of the grippers 65 between the open position and the gripping position. The link mechanism 67 includes a pair of link arms 671 and a link member 672. The link arms 671 are in the form of straight bars having lower ends rotatably coupled to the respective second extensions 654 of the grippers 65 for rotation about respective shafts 673 parallel to the X-axis directions. The link arms 671 have respective upper ends rotatably coupled to each other for rotation about a shaft 674 parallel to the X-axis directions. The link member 672 couples the shaft 674 and the suction pipe 66 to each other. The suction pipe 66 has an upper end fixed to the link member 672.

When the suction pipe 66 is lifted along the Z-axis directions until the lower end 661 thereof is retracted through the through hole 644 in the lower horizontal plate 641 and reaches the lifted position, the link arms 671 pull up the second extensions 654 through the shafts 673, bringing the grippers 65 into the open position. Conversely, when the suction pipe 66 is lowered along the Z-axis directions until the lower end 661 thereof protrudes the through hole 644 below the lower surface of the lower horizontal plate 641 and reaches the operative position, the link mechanism 67 pushes down the second extensions 654 through the shafts 673, bringing the grippers 65 into the gripping position.

The lifting and lowering unit 68 is disposed on the lower horizontal plate 641, and lifts and lowers the suction pipe 66 along the Z-axis directions. The lifting and lowering unit 68 includes an extensible/contractible rod 681 that can be extended upwardly and contracted downwardly. The extensible/contractible rod 681 has an upper end connected to the link member 672. The lifting and lowering unit 68 extends and contracts the extensible/contractible rod 681 to lift and lower the link member 672 in the Z-axis directions. When the lifting and lowering unit 68 lifts and lowers the link member 672 in the Z-axis directions, the suction pipe 66 whose upper end is connected to the link member 672 is lifted and lowered along the Z-axis directions between the lifted position and the operative position. The lifting and lowering unit 68 thus lifts and lowers the suction pipe 66, positioning the lower end 661 thereof selectively in the operative position where the lower end 661 is connected to the opening 151 of the second suction channel 15 and the lifted position where the lower end 661 is spaced from the opening 151 of the second suction channel 15. Furthermore, as the lifting and lowering unit 68 lifts and lowers the link member 672, the lower ends of the link arms 671 are lifted and lowered, angularly moving the grippers 65 between the open position and the gripping position.

According to the present embodiment, therefore, the grippers 65 of the gripping unit 61 are angularly movable between the open position and the gripping position in ganged relation to lifting and lowering movement of the lifting and lowering unit 68 through the link mechanism 67. When the grippers 65 are in the open position, the fingers 655 are opened as illustrated in FIG. 5. When the grippers 65 are in the gripping position, the fingers 655 are closed, gripping the jig table 10, as illustrated in FIG. 6.

Before the processing apparatus 1 starts a processing operation, the operator places the jig table 10 with the workpieces 200 placed on the respective holding areas 121 on the temporary rest area 50, and registered processing content information in the control unit 100. Thereafter, the processing apparatus 1 starts the processing operation in response to a command from the operator to start the processing operation.

When the processing apparatus 1 starts the processing operation, the control unit 100 controls the lifting and lowering unit 68 to position the suction pipe 66 in the lifted position and to position the grippers 65 in the open position, as illustrated in FIG. 5. The control unit 100 also controls the X-axis moving unit 41 to position the table base 20 on the mounting/dismounting area 3. The control unit 100 controls the moving mechanism 71 to position the unloading table 70 in the position juxtaposed in the X-axis directions with the table base 20 that is positioned on the mounting/dismounting area 3.

The control unit 100 controls the Y-axis moving unit 63 of the delivery assembly 60 to position the gripping unit 61 above the jig table 10 placed on the temporary rest area 50. The control unit 100 controls the Z-axis moving unit 62 of the delivery assembly 60, etc. to lower the gripping unit 61 to position the lower horizontal plate 641 immediately above the jig table 10 placed on the temporary rest area 50, and then controls the lifting and lowering unit 68 to position the suction pipe 66 in the operative position and to position the grippers 65 in the gripping position, as illustrated in FIG. 6.

The fingers 655 of the grippers 65 enter below the jig table 10 on the temporary rest area 50, support the lower surface 111 of the base 11 of the jig table 10, and grip both ends in the Y-axis directions of the jig table 10 on the temporary rest area 50, and the lower end 661 of the suction pipe 66 is connected to the opening 151 of the second suction channel 15 in the jig table 10. Then, the control unit 100 controls the suction source 69 to evacuate the suction pipe 66. The second check valve 17 is opened and the first check valve 16 is closed, allowing the suction force from the suction source 69 to act through the second suction channel joint portion 143, the in-the-base through portion 142, and the holding area joint portions 141 of the first suction channel 14 on the holding areas 121 of the jig table 10, holding the workpieces 200 under suction on the holding areas 121.

The control unit 100 controls the Z-axis moving unit 62 of the delivery assembly 60 to lift the gripping unit 61 that is gripping the jig table 10 and also controls the Y-axis moving unit 63 to move the gripping unit 61 that is gripping the jig table 10 in one of the Y-axis directions for thereby positioning the gripping unit 61 above the table base 20 positioned on the temporary rest area 50. The control unit 100 then controls the Z-axis moving unit 62 to lower the gripping unit 61 to place the jig table 10 gripped by the gripping unit 61 onto the upper surface 21 of the table base 20, fitting the fitting land 211 into the fitting recess 113. As the jig table 10 is thus delivered, the second check valve 17 is opened and the first check valve 16 is closed.

The control unit 100 controls the suction sources 24 and 69 to cause the suction source 24 to evacuate the third suction channel 22 and the fourth suction channels 23 and to cause the suction source 69 to stop evacuating the suction pipe 66. The jig table 10 is now held under suction on the table base 20 and secured to the table base 20 under the suction force from the suction source 24. The first check valve 16 is opened and the second check valve 17 is closed, holding the workpieces 200 under suction on the holding areas 121 of the jig table 10 secured to the table base 20 due to the suction force from the suction source 24.

The control unit 100 controls the lifting and lowering unit 68 to position the suction pipe 66 in the lifted position and to position the grippers 65 in the open position, releasing the jig table 10 from the grippers 65. The control unit 100 controls the Z-axis moving unit 62 and the Y-axis moving unit 63 of the delivery assembly 60 to lift the gripping unit 61 and to retract the gripping unit 61 from above the jig table 10 secured to the table base 20.

The control unit 100 controls the X-axis moving unit 41 to move the jig table 10 secured to the table base 20 toward the processing area 2, controls the image capturing unit to capture an image of one of the workpieces 200, and performs the alignment process on the basis of the captured image.

The control unit 100 controls the moving assembly 40 to move the workpieces 200 and the cutting unit 30 while at the same time controlling the cutting unit 30 to cut the workpieces 200 held on the holding areas 121 of the jig table 10 with the cutting blade 31. When all the workpieces 200 held on the holding areas 121 have been cut by the cutting unit 30, the control unit 100 controls the X-axis moving unit 41 to move the jig table 10 toward the mounting/dismounting area 3 and then stop moving the jig table 10 over the mounting/dismounting area 3. As the workpieces 200 are thus cut, the first check valve 16 is opened and the second check valve 17 is closed.

After the control unit 100 has controlled the suction source 24 to stop evacuating the third suction channel 22 and the fourth suction channels 23, releasing the jig table 10 from the table base 20, the control unit 100 controls the lifting and lowering unit 68 to cause the gripping unit 61 to grip the jig table 10 on the table base 20, and then to lift the gripping unit 61 that is gripping the jig table 10, in the same manner as when the jig table 10 is delivered from the temporary rest area 50 onto the table base 20. The control unit 100 then controls the moving mechanism 71 to position the unloading table 70 above the table base 20 over the mounting/dismounting area 3, and controls the lifting and lowering unit 68 to place the jig table 10 gripped by the gripping unit 61 onto the unloading table 70. After the gripping unit 61 has stopped gripping the jig table 10 and has been retracted from above the unloading table 70, the unloading table 70 is moved to the position juxtaposed in the X-axis directions with the table base 20 positioned on the mounting/dismounting area 3. The processing apparatus 1 now finishes the processing operation.

As described above, in the processing apparatus 1 according to the present embodiment, the jig table 10 includes the second suction channel 15 that is open at the upper surface 131 of the block 13 and that is connected through the first suction channel 14 to the holding areas 121, and the delivery assembly 60 includes the suction pipe 66 for applying the suction force to the holding areas 121, the suction pipe 66 being connected to the opening 151 of the second suction channel 15 in the jig table 10 that is gripped by the grippers 65. Therefore, the workpieces 200 can be held under suction on the holding areas 121 of the jig table 10 while the delivery assembly 60 is delivering the jig table 10.

Furthermore, the processing apparatus 1 according to the present embodiment includes the link mechanism 67 that interlinks the movement of the suction pipe 66 between the operative position and the lifted position and the movement of the grippers 65 between the open position and the gripping position. Consequently, the processing apparatus 1 according to the present embodiment can move the suction pipe 66 between the operative position and the lifted position and move the grippers 65 between the open position and the gripping position with the single lifting and lowering unit 68, so that the number of parts used is restrained from increasing. As a result, the processing apparatus 1 according to the present embodiment is advantageous in that it prevents the workpieces 200 from being dislodged while they are being delivered, and the processing apparatus 1 itself is restrained from being complex in structure.

Moreover, the processing apparatus 1 according to the present embodiment includes the first check valve 16 disposed in the other end of the in-the-base through portion 142 of the first suction channel 14 and the second check valve 17 disposed in the other end of the second suction channel 15. While the jig table 10 is being delivered, the second check valve 17 is opened and the first check valve 16 is closed, and while the workpieces 200 are being cut, the first check valve 16 is opened and the second check valve 17 is closed. As a consequence, the processing apparatus 1 according to the present embodiment can hold the workpieces 200 under suction on the holding areas 121 and secure the jig table 10 to the table base 20 while the jig table 10 is being delivered and the workpieces 200 are being cut.

The present invention is not limited to the above embodiment. Various changes and modifications may be made in the embodiment without departing from the scope of the invention. According to the above embodiment, the Y-axis moving unit 63 and the Z-axis moving unit 62 of the delivery assembly 60 move the gripping unit 61 in the Y-axis directions and the Z-axis directions, respectively. According to the present invention, the processing apparatus 1 may include a mounting/dismounting mechanism disposed on the moving member 34 (see FIG. 1) for mounting and dismounting the unit body 64 of the gripping unit 61. When the jig table 10 is to be delivered, the unit body 64 may be mounted on the moving member 34 by the mounting/dismounting mechanism and the gripping unit 61 may be moved in the Y-axis directions and the Z-axis directions respectively by the Y-axis moving unit 42 and the Z-axis moving unit 43. When the workpieces 200 are to be cut, the unit body 64 may be dismounted from the moving member 34 and the gripping unit 61 may be placed in a retracted position, not illustrated, away from the jig table 10. According to the above embodiment, the processing apparatus 1 is a cutting apparatus for cutting workpiece 200. According to the present invention, however, the processing apparatus 1 is not limited to a cutting apparatus.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A processing apparatus for processing a workpiece, comprising:
    a jig table including a holding area for holding a workpiece thereon, a first suction channel having an end connected to the holding area and another end open at a lower surface of the jig table, and a second suction channel having an end connected to the holding area and another end open at an upper surface of the jig table;
    a table base to which the jig table is removably secured, the table base configured to supply negative pressure to the first suction channel from the lower surface of the jig table to the holding area;
    a processing unit for processing the workpiece held on the jig table secured to the table base;
    a moving assembly for moving the table base between a processing area where the workpiece is processed by the processing unit and a mounting/dismounting area where the jig table is mounted on and dismounted from the table base;
    a temporary rest area for temporarily placing thereon the jig table on which the workpiece is supported before the workpiece is processed by the processing unit; and
    a delivery assembly for delivering the jig table from the temporary rest area onto the table base while applying a negative pressure to the second suction channel of the jig table,
    wherein the delivery assembly includes
        a pair of grippers for gripping both sides of the jig table from above,
        a suction pipe connected to an opening of the second suction channel of the jig table configured to supply negative pressure to the holding area to hold the workpiece under suction thereon, and
        a lifting and lowering unit for lifting and lowering the suction pipe to position the suction pipe selectively in an operative position where the suction pipe is connected to the opening of the second suction channel and a lifted position where the suction pipe is spaced from the opening of the second suction channel, and
    wherein the grippers are operatively connected to the lifting and lowering unit by a link mechanism and are openable and closable in response to lifting and lowering movement of the lifting and lowering unit for thereby selectively releasing and gripping the jig table.

2. The processing apparatus according to claim 1, further comprising:
    a pair of check valves disposed respectively in the first suction channel and the second suction channel.

3. The processing apparatus according to claim 1, wherein an upper surface of the table base includes a fitting land that fits into a fitting recess of the table base, said fitting land including a third suction channel.

4. The processing apparatus according to claim 3, wherein the fitting land and the table base includes a plurality of fourth suction channels having upper ends extending to an upper surface of the table base around the fitting land.

* * * * *